US011304166B2

(12) United States Patent
Iwakiri

(10) Patent No.: US 11,304,166 B2
(45) Date of Patent: Apr. 12, 2022

(54) IN-VEHICLE RELAY DEVICE, INFORMATION PROCESSING SYSTEM, RELAY DEVICE, INFORMATION PROCESSING DEVICE, INFORMATION PROCESSING METHOD, AND NON-TRANSITORY RECORDING MEDIUM STORING PROGRAM

(71) Applicant: TOYOTA JIDOSHA KABUSHIKI KAISHA, Toyota (JP)

(72) Inventor: Hideyuki Iwakiri, Tajimi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/031,469

(22) Filed: Jul. 10, 2018

(65) Prior Publication Data
US 2019/0069257 A1 Feb. 28, 2019

(30) Foreign Application Priority Data
Aug. 29, 2017 (JP) .............................. JP2017-164768

(51) Int. Cl.
*H04W 56/00* (2009.01)
*H04W 88/04* (2009.01)
(Continued)

(52) U.S. Cl.
CPC ........ *H04W 56/0045* (2013.01); *G07C 5/008* (2013.01); *H04W 4/40* (2018.02); *H04W 88/04* (2013.01)

(58) Field of Classification Search
CPC .......... H04W 56/0075; H04W 56/007; H04W 56/0055; H04W 56/0045; H04W 56/004; (Continued)

(56) References Cited

U.S. PATENT DOCUMENTS 5,982,778 A * 11/1999 Mangin .................. H04L 47/10
370/252
6,539,004 B1 3/2003 Sawyer
(Continued)

FOREIGN PATENT DOCUMENTS

CN 1249641 A 4/2000
CN 106899632 A 6/2017
(Continued)

*Primary Examiner* — Jeffrey M Rutkowski
*Assistant Examiner* — Sudesh M Patidar
(74) *Attorney, Agent, or Firm* — Hunton Andrews Kurth LLP

(57) ABSTRACT

An in-vehicle relay device used in an in-vehicle network to which a first in-vehicle device and a second in-vehicle device are connected in a communicable way includes: a receiving unit configured to receive first data from the first in-vehicle device; a forwarding unit configured to forward the first data to the second in-vehicle device; and a correction unit configured to correct a sending time at which the first in-vehicle device is to send data, based on a difference between a first receiving time and a first defined receiving time, the first receiving time being a time at which the first data is received by the receiving unit, the first defined receiving time being a time defined for the first data to be received by the receiving unit.

9 Claims, 8 Drawing Sheets

(51) Int. Cl.
*G07C 5/00* (2006.01)
*H04W 4/40* (2018.01)

(58) Field of Classification Search
CPC ......... H04W 4/40; H04W 4/38; H04W 88/04; H04W 88/00; H04W 56/0065; H04W 4/48; G07C 5/008; H04J 3/0682; H04B 7/155; H04L 67/12
USPC .................................................. 370/350, 324
See application file for complete search history.

(56) References Cited

U.S. PATENT DOCUMENTS

| | | | | |
|---|---|---|---|---|
| 2004/0147272 | A1* | 7/2004 | Shiota | H04W 56/00 455/502 |
| 2006/0271658 | A1* | 11/2006 | Beliles, Jr. | H04L 45/306 709/223 |
| 2008/0309481 | A1* | 12/2008 | Tanaka | A61B 5/0002 340/539.12 |
| 2009/0292575 | A1* | 11/2009 | Ellebracht | G06Q 10/06 709/224 |
| 2010/0054244 | A1* | 3/2010 | Tamura | H04J 3/0667 370/389 |
| 2011/0128855 | A1 | 6/2011 | Ando et al. | |
| 2011/0235648 | A1* | 9/2011 | Ando | H04L 12/4625 370/401 |
| 2013/0039185 | A1* | 2/2013 | Teyeb | H04W 28/06 370/235 |
| 2013/0070777 | A1* | 3/2013 | Hutchison | H04L 45/28 370/412 |
| 2013/0107793 | A1* | 5/2013 | Gan | H04W 56/001 370/315 |
| 2013/0229983 | A1* | 9/2013 | Dick | H04B 1/7073 370/328 |
| 2013/0279483 | A1* | 10/2013 | Ishihara | H04W 56/00 370/336 |
| 2013/0304308 | A1* | 11/2013 | Maruyama | B60K 35/00 701/31.4 |
| 2015/0043421 | A1* | 2/2015 | Shimizu | H04W 76/12 370/315 |
| 2015/0295836 | A1* | 10/2015 | Welin | H04W 56/001 370/350 |
| 2017/0149639 | A1* | 5/2017 | Vasseur | H04L 12/44 |
| 2018/0063295 | A1* | 3/2018 | Belikovetsky | H04L 12/1845 |
| 2018/0220283 | A1* | 8/2018 | Condeixa | H04W 28/0215 |
| 2018/0261020 | A1* | 9/2018 | Petousis | H04W 4/44 |
| 2018/0304828 | A1* | 10/2018 | Kitani | B60W 50/0098 |
| 2019/0058662 | A1* | 2/2019 | Hong | H04L 47/32 |
| 2021/0089040 | A1* | 3/2021 | Ebrahimi Afrouzi | B25J 9/1697 |

FOREIGN PATENT DOCUMENTS

| | | |
|---|---|---|
| JP | 2009044564 A | 2/2009 |
| JP | 2011109452 A | 6/2011 |
| JP | 2016005214 A | 1/2016 |
| JP | 2017074887 A | 4/2017 |
| WO | 2011/067809 A1 | 6/2011 |

* cited by examiner

| INFORMATION PROCESSING DEVICE ID | COMMUNICATION ID | PERIOD (ms) | OFFSET (ms) |
|---|---|---|---|
| 101 | 001 | 30 | 0 |
|  | 002 | 40 | 10 |
| 102 | — | 50 | 20 |
| 103 | — | 100 | 30 |
| ... | ... | ... | ... |

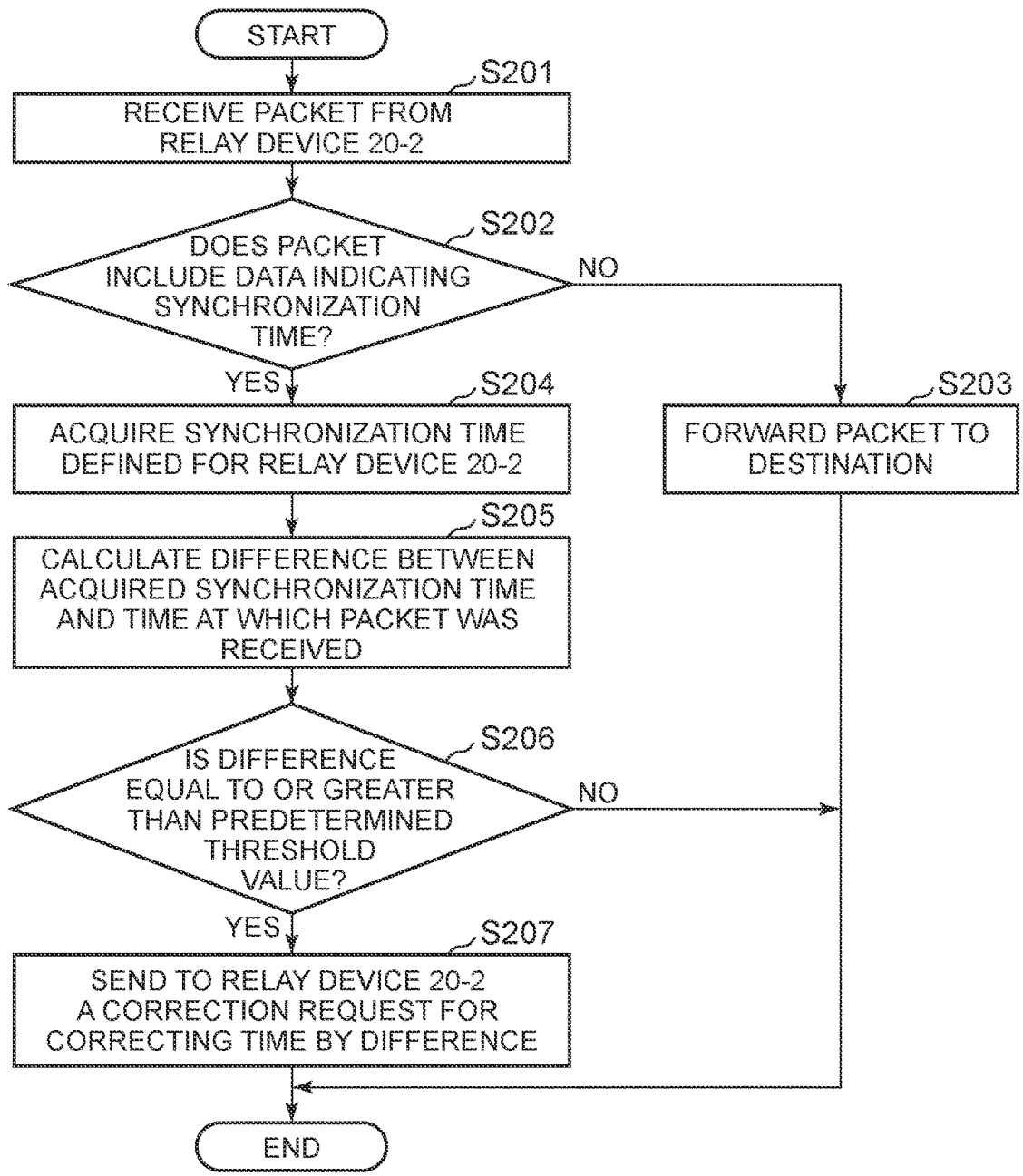

IN-VEHICLE RELAY DEVICE, INFORMATION PROCESSING SYSTEM, RELAY DEVICE, INFORMATION PROCESSING DEVICE, INFORMATION PROCESSING METHOD, AND NON-TRANSITORY RECORDING MEDIUM STORING PROGRAM

INCORPORATION BY REFERENCE

The disclosure of Japanese Patent Application No. 2017-164768 filed on Aug. 29, 2017 including the specification, drawings and abstract is incorporated herein by reference in its entirety.

BACKGROUND

1. Technical Field

The present disclosure relates to an in-vehicle relay device, an information processing system, a relay device, an information processing device, an information processing method, and a non-transitory recording medium storing a program.

2. Description of Related Art

In a system in which a plurality of devices communicates with each other, there is known a technique that allows the devices to time-synchronize with each other to prevent a sending-frame collision and send data at predetermined times (for example, refer to Japanese Patent Application Publication No. 2016-005214 (JP 2016-005214 A) and Japanese Patent Application Publication No. 2011-109452 (JP 2011-109452 A)). As the standards using this technique, FlexRay, TTEthernet, and Time-Sensitive Networking (TSN) are known.

SUMMARY

However, in the technique described above, the mechanism to establish time synchronization among the devices is relatively complex.

The present disclosure provides a technique for relatively easily correcting the time at which data is sent.

A first aspect of the disclosure provides an in-vehicle relay device used in an in-vehicle network to which a first in-vehicle device and a second in-vehicle device are connected in a communicable way. The in-vehicle relay device according to the first aspect includes: a receiving unit configured to receive first data from the first in-vehicle device; a forwarding unit configured to forward the first data to the second in-vehicle device; and a correction unit configured to correct a sending time at which the first in-vehicle device is to send data, based on a difference between a first receiving time and a first defined receiving time, the first receiving time being a time at which the first data is received by the receiving unit, the first defined receiving time being a time defined for the first data to be received by the receiving unit.

According to a first aspect, the in-vehicle relay device corrects the time at which data is sent, based on a difference between the time at which the data was received from the in-vehicle device and the receiving time defined for the data. Therefore, the time at which data is sent can be corrected relatively easily.

In the first aspect, the correction unit may be configured to send a correction request including information on the difference between the first receiving time and the first defined receiving time to the first in-vehicle device when the difference is equal to or greater than a predetermined threshold.

According to the configuration described above, the in-vehicle relay device corrects the time at which the in-vehicle device is to send data if the difference between the time at which data was received from the in-vehicle device and the receiving time defined for the data is equal to or greater than a predetermined threshold value. Therefore, the time at which data is sent can be corrected relatively easily.

In the first aspect, the correction unit may be configured to correct the sending time based on the difference between the first receiving time and the first defined receiving time when a priority of the first data is equal to or higher than a predetermined priority, and not to correct the sending time when the priority of the first data is lower than the predetermined priority.

According to the configuration described above, for data having a relatively high priority, the in-vehicle relay device corrects the time at which the in-vehicle device is to send the data. Therefore, the time at which data having a relatively high priority is sent can be corrected relatively easily.

In the first aspect, the correction unit may be configured to return a data-sending pause request to the first in-vehicle device when the priority of the first data is lower than the predetermined priority and when a free space of a buffer in the in-vehicle relay device is equal to or less than a predetermined threshold value, the data-sending pause request including a specification of a predetermined pause time.

According to the configuration described above, for data having a relatively low priority, the in-vehicle relay device pauses the sending of data if the free space of the buffer is low. Therefore, for data having a relatively high priority, the possibility that a packet loss will occur can be reduced.

In the first aspect, the correction unit may be configured to determine the priority of the first data based on at least one of a communication protocol of the first data, a communication address of a sending source of the first data, and a communication address of a destination of the first data.

According to the configuration described above, for data having a relatively high priority, the in-vehicle relay device corrects the time at which the in-vehicle device is to send data. Therefore, the time at which data having a relatively high priority is sent can be corrected relatively easily.

In the first aspect, the receiving unit may be configured to receive second data from another in-vehicle relay device, the second data indicating a synchronization time between the in-vehicle relay device and the other in-vehicle relay device and the correction unit may be configured to cause the other in-vehicle relay device to synchronize with the in-vehicle relay device based on a difference between a second receiving time and a second defined receiving time, the second receiving time being a time at which the second data indicating the synchronization time is received by the receiving unit, the second defined receiving time being a time defined for the second data to be received by the receiving unit.

According to the configuration described above, a plurality of in-vehicle relay devices correct the time at which each in-vehicle relay device is to send data. Therefore, the processing load of the in-vehicle relay devices can be distributed.

A second aspect of the disclosure provides an information processing system, including: a first information processing device; and a relay device used in a network to which the first information processing device and a second information processing device are connected in a communicable way. The relay device includes a first receiving unit configured to receive first data from the first information processing device a forwarding unit configured to forward the first data to the second information processing device and a correction unit configured to send a correction request based on a difference between a first receiving time and a first defined receiving time, the correction request including a request for correcting a sending time at which the first information processing device is to send data, the first receiving time being a time at which the first data is received by the first receiving unit, the first defined receiving time being a time defined for the first data to be received by the first receiving unit. The first information processing device includes: a sending unit configured to send data; a second receiving unit configured to receive the correction request; and a control unit configured to correct the sending time according to the correction request.

A third aspect of the disclosure provides a relay device including: a receiving unit configured to receive first data from a first information processing device; a forwarding unit configured to forward the first data to a second information processing device; and a correction unit configured to correct a sending time at which the first information processing device is to send data, based on a difference between a time at which the first data is received and a first defined receiving time defined for the first data to be received by the receiving unit.

A fourth aspect of the disclosure provides an information processing device, including: a sending unit configured to send data at a predetermined time; a receiving unit configured to receive a request for correcting a time at which the data is to be sent; and a control unit configured to correct the time at which the data is to be sent according to the request received by the receiving unit.

A fifth aspect of the disclosure provides an information processing method including: receiving, by a relay device, first data from a first information processing device, the relay device being used in a network to which the first information processing device and a second information processing device are connected in a communicable way; forwarding, by the relay device, the first data to the second information processing device; and correcting a time at which the first information processing device is to send data based on a difference between a first receiving time and a first defined receiving time, the first receiving time being a time at which the first data was received in the receiving of the first data, the first defined receiving time being defined for the first data to be received by the relay device.

A sixth aspect provides a non-transitory recording medium storing a program. The program is executable by a relay device, the relay device being used in a network to which a first information processing device and a second information processing device are connected in a communicable way, the relay device having at least one processor. The program, when executed by the at least one processor, causes the relay device to execute a method, the method including: receiving first data from the first information processing device; forwarding the first data to the second information processing device; and correcting a sending time at which the first information processing device is to send data based on a difference between a first receiving time and a first defined receiving time, the first receiving time being a time at which the first data was received in the receiving of the first data, the first defined receiving time being defined for the first data to be received by the relay device.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 10 is a flowchart showing an example of the synchronization processing of the relay device according to the second embodiment; and FIG. 11 is a diagram showing an example of synchronization time data.

DETAILED DESCRIPTION OF EMBODIMENTS

Embodiments of the present disclosure will be described in detail below with reference to the drawings.

First Embodiment

<System Configuration>

Figure 1:
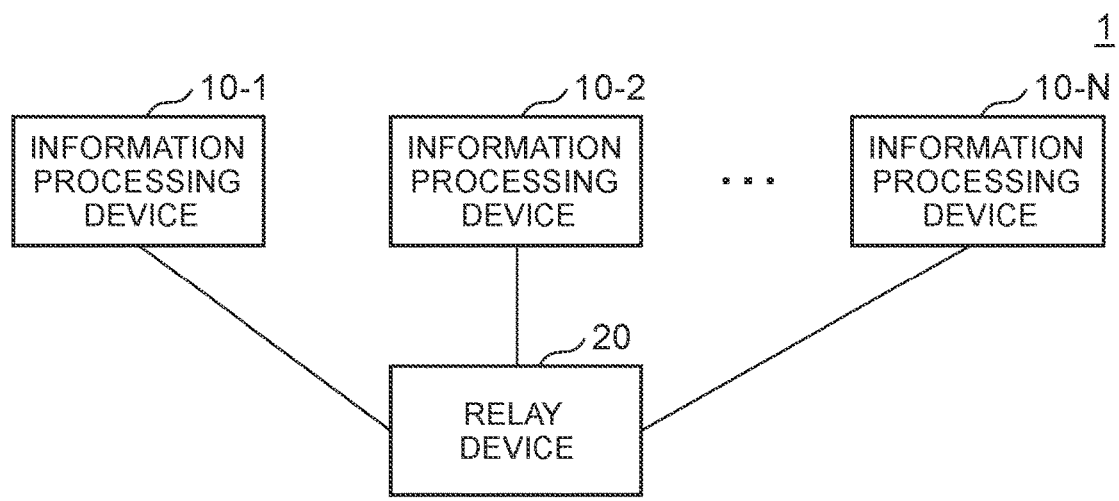
FIG. 1 is a diagram showing an example of a configuration of an information processing system according to an embodiment.

FIG. 1 is a diagram showing an example of a configuration of an information processing system 1 according to a first embodiment. Referring to FIG. 1, the information processing system 1 includes information processing devices 10-1, 10-2, . . . , 10-N (in the description below, simply referred to as "information processing device 10" unless each device must be uniquely identified) and a relay device 20. Note that the information processing system 1 may include a plurality of relay devices 20.

The information processing devices 10-1, 10-2, . . . , 10-N are connected to each other over a network (for example, an in-vehicle Local Area Network (LAN), a LAN, a wireless LAN, the Internet, or a mobile telephone network such as a Long Term Evolution (LTE) to 5G (5th Generation) network) via at least one or more relay devices 20.

In the following, an in-vehicle system will be described as an example of the information processing system 1. In this in-vehicle system, the in-vehicle devices, each of which is an example of the information processing device 10, are connected over an in-vehicle LAN (in-vehicle Ethernet), which is based on the Ethernet (registered trade mark) standard, via an in-vehicle relay device that is an example of the relay device 20.

It should be noted that the disclosed technique is applicable to various terminals and various relay devices in the information processing system 1 that is used as various network systems, such as an equipment control network system used in factories and an Internet of Things (IoT) system in which the devices, such as a sensor, are connected to the cloud.

The information processing device 10 is an in-vehicle device such as a sensor, an in-vehicle Electronic Control Unit (ECU), and so on.

The relay device 20 is, for example, an in-vehicle relay device used in an in-vehicle network to which the in-vehicle devices are connected in such a way that they can communicate with each other. More specifically, the relay device 20 is an in-vehicle relay device such as a layer 2 switch (switch), a layer 3 switch, or a router. The relay device 20 may have the QoS function using CoS, ToS, or DiffServ.

<Hardware Configuration>

Figure 2:
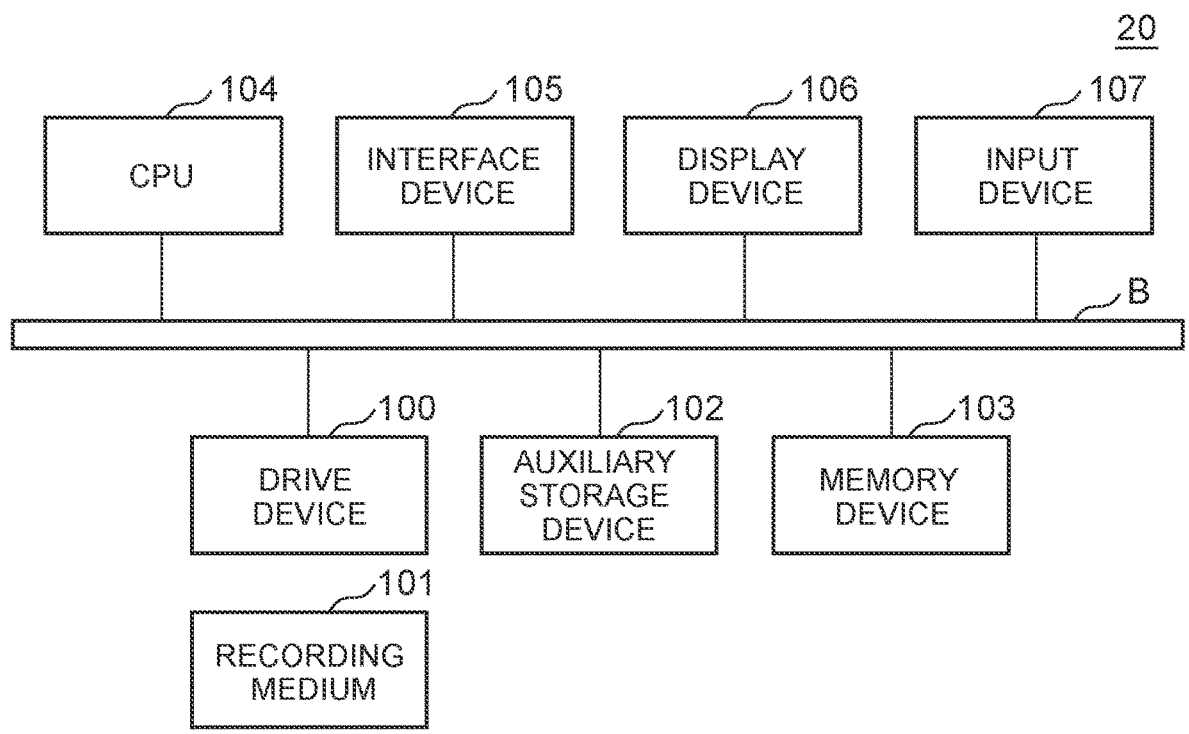
FIG. 2 is a diagram showing an example of a hardware configuration of an information processing device and a relay device according to the embodiment.

FIG. 2 is a diagram showing an example of a hardware configuration of the information processing device 10 and the relay device 20 according to the embodiment. In the description below, the relay device 20 will be described as an example. The relay device 20 shown in FIG. 2 includes a drive device 100, an auxiliary storage device 102, a memory device 103, a Central Processing Unit (CPU) 104, an interface device 105, a display device 106 and an input device 107. These devices are connected to each other via a bus B.

The information processing program for implementing the processing in the relay device 20 is provided, for example, by a recording medium 101. When the recording medium 101 that stores the information processing program is set in the drive device 100, the information processing program is installed from the recording medium 101 to the auxiliary storage device 102 via the drive device 100. Note that it is not always necessary to install the information processing program from the recording medium 101; instead, the information processing program may be downloaded from another computer over the network. The auxiliary storage device 102 stores the installed information processing programs as well as the necessary files and data.

The memory device 103 is, for example, a Random Access Memory (RAM). When an instruction to activate a program is issued, the program is read from the auxiliary storage device 102 and is stored in the memory device 103. The CPU 104 implements the function related to the relay device 20 according to the program stored in the memory device 103. The interface device 105 is used as an interface for connecting to the network. The interface device 105 is provided for each of a plurality of network ports provided in the relay device 20.

An example of the recording medium 101 is a portable recording medium such as a CD-ROM, a DVD disc, or a USB memory. An example of the auxiliary storage device 102 is a Hard Disk Drive (HDD) or a flash memory. Both the recording medium 101 and the auxiliary storage device 102 are a computer-readable recording medium.

The hardware configuration of the information processing device 10 may be similar to that of the relay device 20. Note that the information processing device 10 may have only one interface device 105.

<Functional Configuration>

Figure 3:
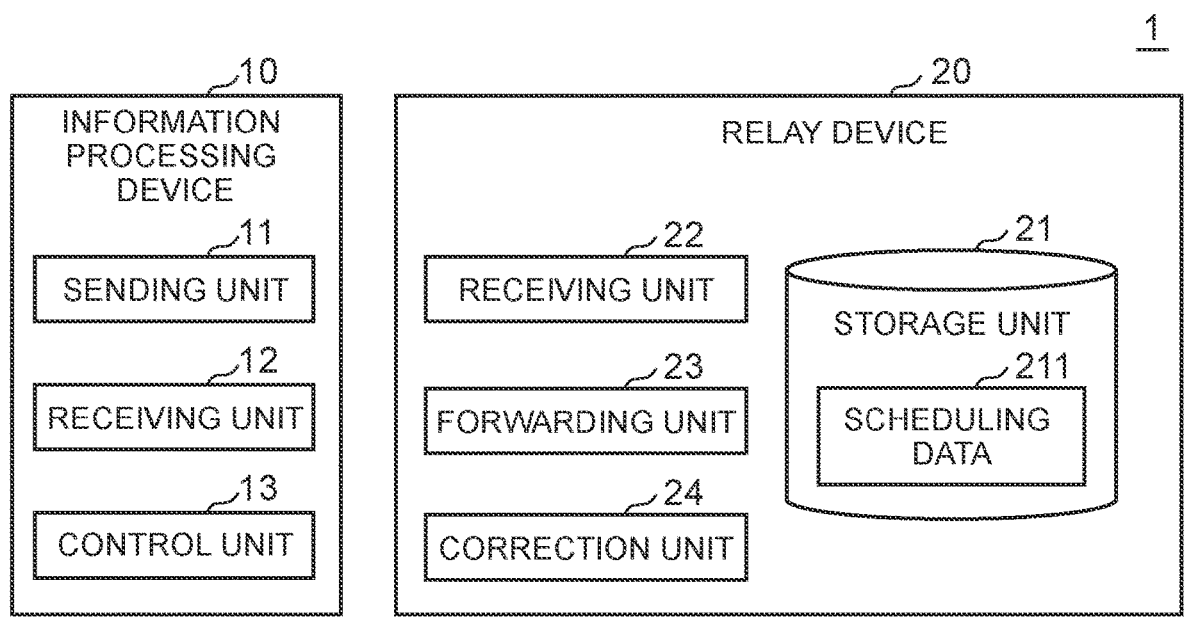
FIG. 3 is a diagram showing an example of a functional block diagram of the information processing device and the relay device according to the embodiment.

Next, with reference to FIG. 3, the functional configuration of the information processing device 10 and the relay device 20 according to the embodiment will be described. FIG. 3 is a diagram showing an example of the functional block diagram of the information processing device 10 and the relay device 20 according to the embodiment.

«Information Processing Device»

The information processing device 10 includes a sending unit 11, a receiving unit 12, and a control unit 13. The sending unit 11, the receiving unit 12, and the control unit 13 each represent a function implemented by the processing that one or more programs, installed in the information processing device 10, cause the CPU of the information processing device 10 to execute.

The sending unit 11 sends data to other information processing devices 10 via the relay device 20 at a predetermined time, for example, at a fixed periodic interval.

The receiving unit 12 receives data sent from other information processing devices 10. In addition, the receiving unit 12 receives, from the relay device 20, a request to correct (modify, change) the time at which data is sent.

The control unit 13 corrects the time at which the sending unit 11 is to send data from this time on according to a request received by the receiving unit 12.

«Relay Device»

The relay device 20 has a storage unit 21. The storage unit 21 is implemented, for example, by the auxiliary storage device 102. The storage unit 21 stores scheduling data 211 and so on. The data stored in the scheduling data 211 will be described later.

The relay device 20 includes a receiving unit 22, a forwarding unit 23, and a correction unit 24. The receiving unit 22, the forwarding unit 23, and the correction unit 24 each represent a function implemented by the processing that one or more programs, installed in the relay device 20, cause the CPU 104 of the relay device 20 to execute.

The receiving unit 22 receives data from the information processing device 10 ("first in-vehicle device") via another relay device 20 or directly (that is, not via other relay devices 20). The forwarding unit 23 forwards the data, received by the receiving unit 22, to another information processing device 10 ("second in-vehicle device") specified as the destination.

The correction unit 24 corrects the time at which the information processing device 10, which is the sending source of data, is to send data from this time on, based on the difference between the time at which data was received by the receiving unit 22 and the receiving time defined for the data <Processing>

«Processing of Relay Device 20»

Figure 4:
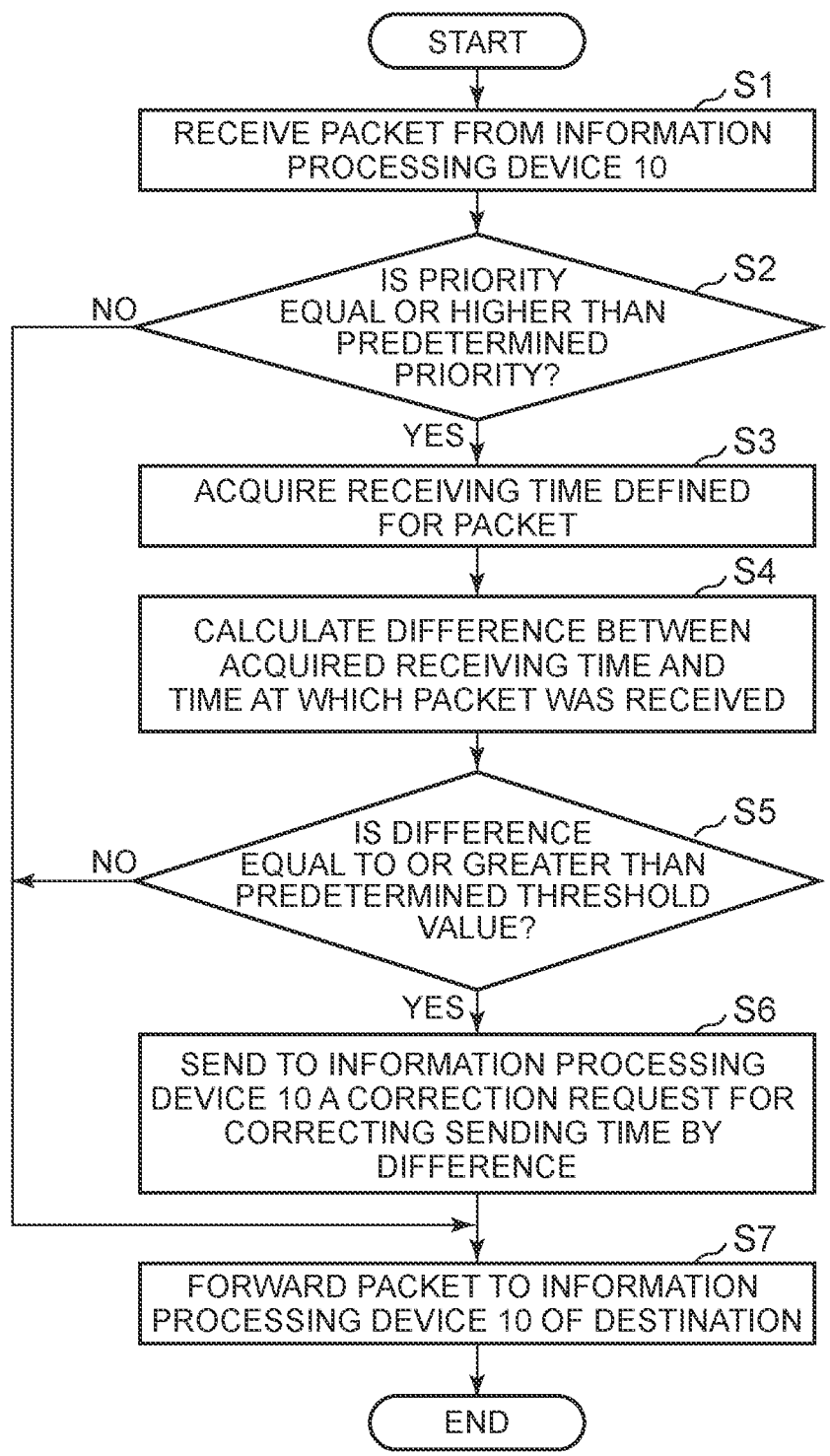
FIG. 4 is a flowchart showing an example of the processing of the relay device according to the embodiment.
Figures 5, 6:
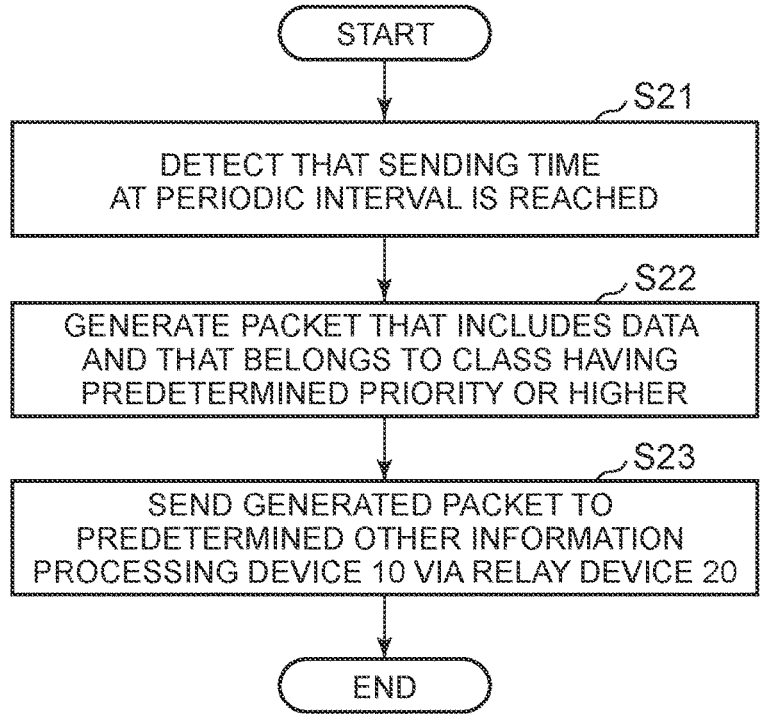
FIG. 5 is a diagram showing an example of scheduling data.
FIG. 6 is a flowchart showing an example of the periodic sending-time processing of the information processing device according to the embodiment.

Next, with reference to FIG. 4 and FIG. 5, the processing of the relay device 20 according to the first embodiment will be described. FIG. 4 is a flowchart showing an example of the processing of the relay device 20 according to the first embodiment. FIG. 5 is a diagram showing an example of the scheduling data 211.

In step S1, the receiving unit 22 receives a packet of data from the information processing device 10.

Next, the correction unit 24 determines whether the class of the received packet is a class having a predetermined priority or higher (step S2). In this step, the correction unit 24 may use the 3-bit Class of Service (CoS) field, included in the Ethernet header, to determine the class of the packet. Alternatively, the correction unit 24 may use the predetermined field of the IP header to determine the class of the packet according to the QoS protocol such as Type of Service (ToS) or Differentiated Services (DiffServ).

If all the information processing devices 10 send only high priority packets, the correction unit 24 may skip the processing in step S2 and perform the processing in step S3 and the following steps that will be described later.

If the priority of the class is not equal to or higher than the predetermined priority (NO in step S2), the processing proceeds to step S7 that will be described later. That is, if the priority of the class is not equal to or higher than the predetermined priority, the correction unit 24 does not correct the sending time.

If the priority of the class is equal to or higher than the predetermined priority (YES in step S2), the correction unit 24 references the scheduling data 211 to acquire the sending time of the information processing device 10 (that is, "receiving time" of the relay device 20) that is defined for the packet (step S3).

In the example shown in FIG. 5, the scheduling data 211 stores the following items: information processing device ID, communication ID, period, and offset.

The item "Information processing device ID" indicates the identification information on the information processing device 10. The information processing device ID may be the MAC address of the information processing device 10 or the communication address such as the IP address. The item "communication ID" indicates the identification information on an application in the information processing device 10 that is the sending source of data. For example, the communication ID may be the information on the port number of a communication protocol in the transport layer (or a higher layer) or the port number of the destination. Note that the item "communication ID" need not be included in the scheduling data 211 when the relay device 20 is a layer 2 switch that determines the destination of a frame in the data link layer and forwards the frame or when each of the information processing devices 10 has only one application that sends a packet of a class whose priority is a predetermined priority or higher.

The item "period" indicates a periodic interval at which an application in the information processing device 10 sends data. The item "offset" indicates the difference between the predetermined base time (predetermined time of day, etc.) and a time at which the application in the information processing device 10 sends data and which is later than and closest to the predetermined time.

In the example shown in FIG. 5, the application having the information processing device ID "101" and the communication ID "001" has a period of 30 milliseconds and an offset of 0 millisecond. Therefore, data is scheduled to be sent from this application at each sending time that is a time when a period of time (0 millisecond, 30 milliseconds, 60 milliseconds, . . . ) has elapsed from the predetermined base time. Similarly, the applications having the information processing device ID "101" and the communication ID "002" has a period of 40 milliseconds and an offset of 10 milliseconds. Therefore, data is scheduled to be sent from this application at each sending time that is a time a period of time (10 milliseconds, 50 milliseconds, 90 milliseconds, . . . ) has elapsed from the predetermined base time.

As the data stored in the scheduling data 211, the data that realizes scheduling, designed so that congestion does not occur in the relay device 20 in the information processing system 1, may be preset at factory shipment time.

In step S3, the correction unit 24 checks the communication address of the sending source of the packet and the port number of the communication protocol or the destination to determine the information processing device ID and the communication ID for the packet. After that, the correction unit 24 acquires the sending time (in other words, the receiving time of the relay device 20) that is calculated based on the period and the offset, which are stored in the scheduling data 211 in association with the information processing device ID and the communication ID, and that is closest to the current time.

Next, the correction unit 24 calculates the difference between the sending time (in other words, the receiving time of the relay device 20) acquired in step S3 and the time at which the packet was received (step S4). To do so, the correction unit 24 first subtracts the offset from the elapsed time, from the predetermined base time to the current time, and then divides the resulting difference by the period to calculate the remainder. Next, from the calculated remainder, the correction unit 24 subtracts the period to calculate the difference. The correction unit 24 may use the smaller of the absolute values of the calculated two values (the remainder and the difference) as the difference between the sending time (in other words, the receiving time of the relay device 20) and the time at which the packet was received.

Next, the correction unit 24 determines whether the absolute value of the difference calculated in step S4 is equal to or greater than a predetermined threshold value (for example, 2 milliseconds) (step S5).

If the difference is not equal to or greater than the predetermined threshold value (NO in step S5), the processing proceeds to step S7 that will be described later.

If the difference is equal to or greater than the predetermined threshold value (YES in step S5), the correction unit 24 sends to the information processing device 10 a correction request for correcting the next and subsequent sending times by the difference calculated in step S4 (Step S6).

Next, the forwarding unit 23 sends (forwards) the packet, received in step S1, to the information processing device 10 of the destination (step S7).

<First Modification>

In step S2, instead of determining the class of the received packet based on the CoS field and so on, the correction unit 24 may determine the class of the received packet based not only on the CoS field and so on but also on one or more of the communication protocol of the transport layer or a higher layer, the communication address of the data sending source, and the communication address of the destination. In this case, the communication address may include at least one of the MAC address, the IP address, the port number, and the physical port of the relay device 20 that has received the data.

In this case, when the data is received from a physical port to which the information processing device 10 that sends the information on the sensors necessary for autonomous driving is connected or when the data is to be sent to a physical port to which the information processing device 10 that performs control concerning autonomous driving is connected, the correction unit 24 may determine that the data belongs to a class having a priority higher than the predetermined priority.

<Second Modification>

If a packet of data received from the information processing device 10 does not belong to a class having a priority equal to or higher than the predetermined priority, the correction unit 24 may perform the following processing in order to prevent a packet loss due to congestion in the relay device 20.

If a packet of data received from the information processing device 10 does not belong to a class having a priority equal to or higher than the predetermined priority and if the amount of free space in the buffer in the relay device 20 is equal to or less than a first threshold value, the correction unit 24 sends a Pause frame (an example of "a data-sending pause request"), which includes the specification of a predetermined pause time, to the information processing device 10. Then, in response to the Pause frame, the control unit 13 of the information processing device 10 causes the sending unit 11 to pause the sending of data for the time specified in the Pause frame.

If the amount of free space in the buffer in the relay device 20 becomes equal to or greater than a second threshold value that is greater than the first threshold value, the correction unit 24 sends a Pause frame, which specifies 0 for the pause time, to the information processing device 10. Then, in response to the Pause frame, the control unit 13 of the information processing device 10 resumes the sending of data by the sending unit 11.

«Processing of Information Processing Device 10»
(Processing During Periodic Sending)

Next, with reference to FIG. 6, the processing performed by the information processing device 10 according to the embodiment for periodically sending data will be described. FIG. 6 is a flowchart showing an example of the periodic sending processing performed by the information processing device 10 according to the embodiment.

In the following description, it is assumed that the sending unit 11 of the information processing device 10 sends data, measured by a sensor such as a radar that measures the area in front of the vehicle, to a predetermined other information processing device 10 through the relay device 20 at a predetermined periodic interval.

In step S21, the sending unit 11 detects, by a timer measuring a predetermined period, that the sending time that occurs at a predetermined periodic interval is reached. The predetermined period is a period that is set in advance.

Next, the sending unit 11 generates a packet that includes data measured by the sensor and that belongs to a class having a predetermined priority or higher (step S22).

Next, the sending unit 11 sends the generated packet to a predetermined other information processing device 10 via the relay device 20 (step S23).

The sending unit 11 may send data generated by an application for diagnosing life or death of the information processing device 10, or data generated by an application for updating the software of the information processing device 10, at a periodic interval. Furthermore, the sending unit 11 may send data corresponding to a user's operation event when that event occurs.

In this case, if a certain degree of delay is allowed for these data, the sending unit 11 may send these data to a predetermined other information processing device 10 via the relay device 20, using a packet of a class having a priority not equal to or higher than the predetermined priority.

(Processing when a Sending Time Correction Request is Received)

Figure 7:
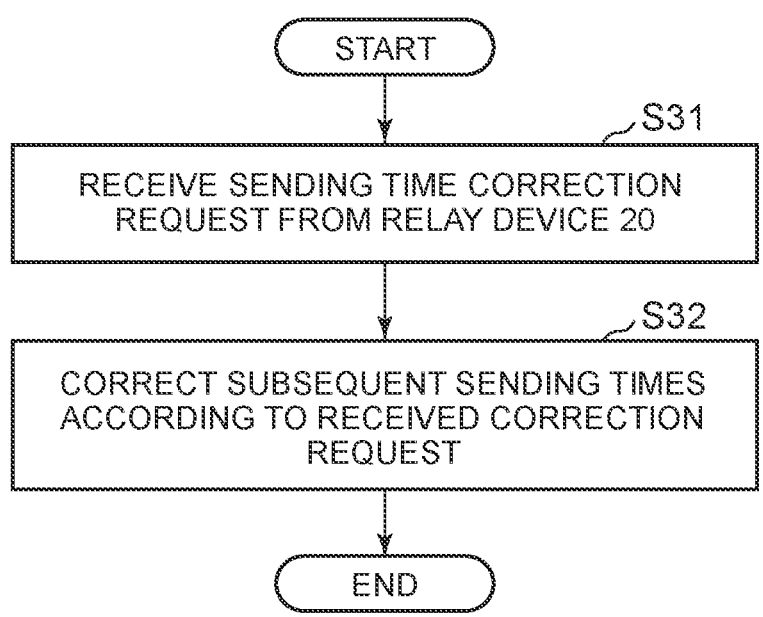
FIG. 7 is a flowchart showing an example of the processing when the information processing device according to the embodiment receives a request for correcting a sending time.

Next, with reference to FIG. 7, the processing performed when the information processing device 10 according to this embodiment receives a sending time correction request from the relay device 20 will be described. FIG. 7 is a flowchart showing an example of the processing performed when the information processing device 10 according to this embodiment receives a sending time correction request.

In step S31, the receiving unit 12 receives a sending time correction request from the relay device 20.

Next, the control unit 13 corrects the subsequent sending times according to the received correction request (step S32). Here, the correction request includes the value of the difference calculated by the relay device 20 in step S4. For example, the control unit 13 subtracts the difference value from the timer measuring a predetermined period that was set at the previous sending time. After that, in step S21, the sending unit 11 detects, by the timer, that the sending time of the predetermined period is reached. As a result, the next and subsequent sending times of the information processing device 10 are corrected.

Second Embodiment

In the first embodiment, an example was described where, in the information processing system 1 that has one or more relay devices 20, one relay device 20 corrects the sending time of each of the information processing devices 10 in the information processing system 1. On the other hand, in a second embodiment, an example will be described where each of a plurality of relay devices 20 corrects the sending time of each of information processing devices 10 directly connected to that relay device 20 and, at the same time, one relay device 20 corrects a time managed by another relay devices 20 to cause the another relay device 20 to synchronize with the relay device 20. In the second embodiment, the plurality of the relay devices 20 correct the sending time of each the information processing device 10, allowing the processing load of each of the relay devices 20 to be distributed.

Since the second embodiment is the same as the first embodiment except a part, the description is omitted as appropriate. In the following, the part common to the first embodiment will be omitted and only the different part will be described.

<System Configuration>

Figure 8:
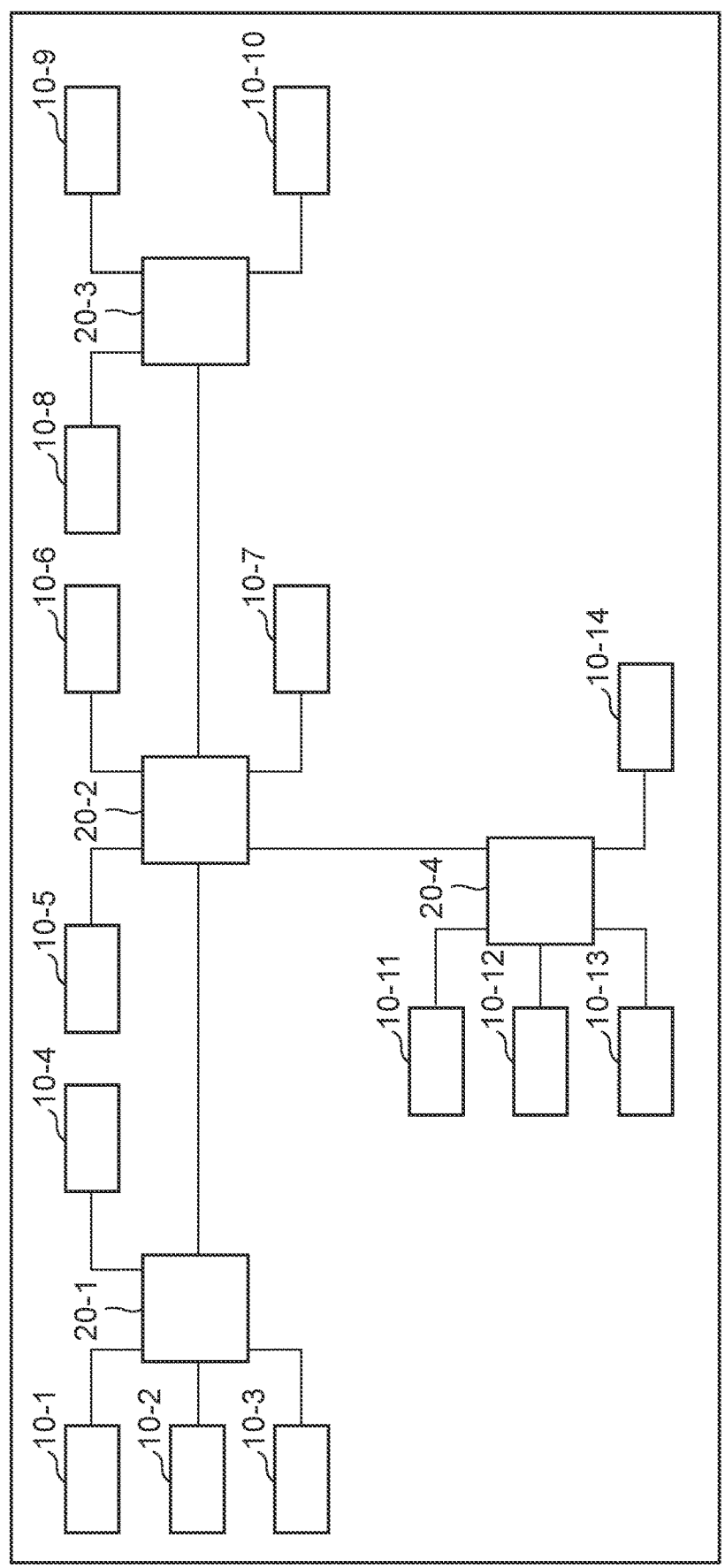
FIG. 8 is a diagram showing an example of a configuration of an information processing system according to a second embodiment.

FIG. 8 is a diagram showing an example of a configuration of an information processing system 1 according to the second embodiment. In FIG. 8, the information processing system 1 includes relay devices 20-1, 20-2, 20-3, and 20-4 (hereinafter, simply referred to as "the relay device 20" unless it is necessary to distinguish between them) and information processing devices 10-1 to 10-14 (hereinafter simply referred to as "the information processing device 10" unless it is necessary to distinguish between them). Note that the number of relay devices 20 and the number of information processing devices 10 are not limited to those in the example shown in FIG. 8.

In FIG. 8, the information processing devices 10-1 to 10-4 and the relay device 20-2 are connected directly to the relay device 20-1 by cables. The information processing devices 10-5 to 10-7 and the relay devices 20-1, 20-3, and 20-4 are connected directly to the relay device 20-2. The information processing devices 10-8 to 10-10 and the relay device 20-2 are connected directly to the relay device 20-3. The information processing devices 10-11 to 10-14 and the relay device 20-2 are connected directly to the relay device 20-4.

In the following description, it is assumed that the information processing device 10-10, connected directly to the relay device 20-3, is an in-vehicle ECU that performs control concerning autonomous driving such as Advanced Driving Assistant System (ADAS). It is also assumed that the relay device 20-3, to which the information processing device 10-10 is directly connected, has hardware for implementing the time synchronization function such as Ethernet Audio Video Bridging (AVB). In this case, the time may be adjusted in a hierarchical structure in such a way that the relay device 20-3 adjusts the time of the relay device 20-2 directly connected to the relay device 20-3 and that the relay device 20-2 adjusts the time of the relay devices other than the relay device 20-3 (that is, the relay devices 20-1 and 20-4) connected directly to the relay devices 20-2.

<Functional Configuration>

Figure 9:
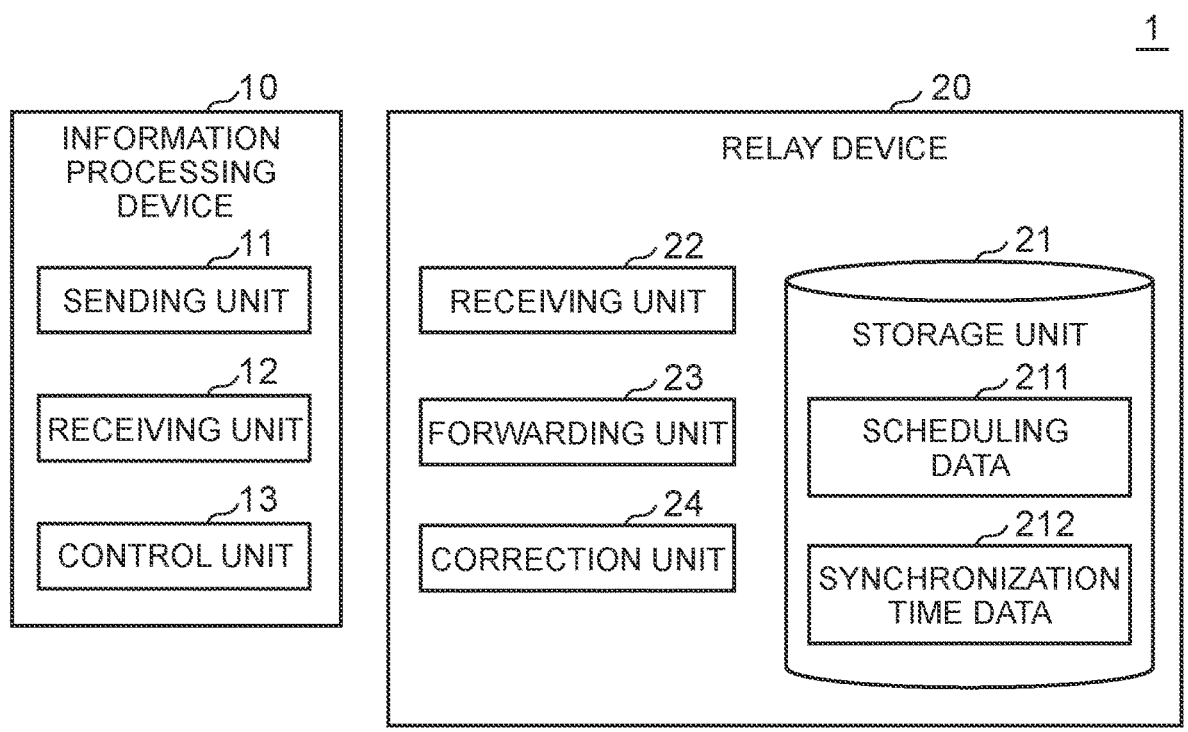
FIG. 9 is a diagram showing an example of a functional block diagram of a relay device according to the second embodiment.

Next, with reference to FIG. 9, a functional configuration of the relay device 20 according to the second embodiment will be described. FIG. 9 is a diagram showing an example of a functional block diagram of the relay device 20 according to the second embodiment.

«Relay Device»

A storage unit 21 of the relay device 20 according to the second embodiment stores scheduling data 211 as well as synchronization time data 212. The data stored in the synchronization time data 212 will be described later.

<Processing>

«Processing of Relay Device 20»

Each of the plurality of the relay devices 20 according to the second embodiment performs the processing similar to the processing of the relay device 20 in the first embodiment shown in FIG. 4 to correct the sending time of each of the information processing devices 10 connected directly to the relay device 20.

With reference to FIG. 10 and FIG. 11, the processing of the relay device 20-3 according to the second embodiment will be described. In this processing, the relay device 20-3 causes the relay device 20-2, one of the other relay devices, to synchronize with itself (that is, the relay device 20-3). FIG. 10 is a flowchart showing an example of the synchronization processing of the relay device 20 according to the second embodiment. FIG. 11 is a diagram showing an example of the synchronization time data 212.

In the following, an example will be described in which the relay device 20-3 causes the relay device 20-2 to synchronize with itself (that is, the relay device 20-3).

In step S201, a receiving unit 22 of the relay device 20-3 receives a packet from the relay device 20-2.

Next, the receiving unit 22 of the relay device 20-3 determines whether the received packet includes data indicating the synchronization time (step S202). The data indicating the synchronization time may be sent in a frame in the data link layer.

If the packet does not include data indicating the synchronization time (NO in step S202), a forwarding unit 23 of the relay device 20-3 sends (or forwards) the packet, received by the receiving unit 22, to the destination, either the information processing device 10 or the relay device 20, specified in the packet (step S203) and then terminates the processing.

If the packet includes data indicating the synchronization time (YES in step S202), a correction unit 24 of the relay device 20-3 refers to the synchronization time data 212 to acquire the synchronization time defined for the relay device 20-2 (step S204).

In the example shown in FIG. 11, the synchronization time data 212 stores the following items: relay device ID, period, and offset. The data stored in the synchronization time data 212 may be preset at factory shipment time.

The item "relay device ID" is the identification information on the relay device 20. For example, the relay device ID may be a communication address, such as the MAC address of the relay device 20, or a physical port number.

The item "period" is the information on a periodic interval at which the other relay device 20 sends a packet indicating the synchronization time. The value of the period may be the value of the least common multiple of the periodic intervals at which the information processing devices 10, whose sending times are managed by the other relay device 20, send data. For example, when the sending periods of the information processing devices 10-5, 10-6, and 10-7, whose sending times are managed by the relay device 20-2, are 50 milliseconds, 20 milliseconds and 30 milliseconds respectively, the least common multiple, 300 milliseconds in this case, is set as the period of the relay device 20-2.

The item "offset" indicates the difference between the predetermined base time and a time at which the other relay device 20 sends a packet indicating the synchronization time and which is later than and closest to the predetermined time.

In the example shown in FIG. 11, the relay device 20 identified by the information processing device ID "202" has a period of 3000 milliseconds and an offset of 0 millisecond. Therefore, a packet indicating the synchronization time is scheduled to be sent from the relay device 20 every 3 seconds, beginning at the predetermined base time.

In step S204, the correction unit 24 of the relay device 20-3 checks the communication address of the sending source of the packet to determine the relay device ID from which the packet was sent. Then, the correction unit 24 acquires the sending time that is a synchronization time calculated based on the period and the offset, stored in the synchronization time data 212 in association with the relay device ID, and that is closest to the current time.

Next, the correction unit 24 of the relay device 20-3 calculates the difference between the synchronization time, acquired in step S204, and the time at which the packet was received (step S205). To do so, the correction unit 24 of the relay device 20-3 first subtracts the offset from the elapsed time, from the predetermined base time to the current time, and then divides the resulting difference by the period to calculate the remainder. Next, from the calculated remainder, the correction unit 24 subtracts the period to calculate the difference. The correction unit 24 may use the smaller of the absolute values of the calculated two values (the remainder and the difference) as the difference between the synchronization time and the time at which the packet was received.

Next, the correction unit 24 of the relay device 20-3 determines whether the absolute value of the difference calculated in step S205 is equal to or greater than a predetermined threshold value (for example, 2 milliseconds) (step S206).

If the absolute value of the difference is not equal to or greater than the predetermined threshold value (NO in step S206), the processing is terminated.

If the absolute value of the difference is equal to or greater than the predetermined threshold value (YES in step S206), the correction unit 24 of the relay device 20-3 sends a correction request for correcting the time by the difference, calculated in step S205, to the relay device 20-2 (step S207) and then terminates the processing.

Then, upon receiving the correction request, the correction unit 24 of the relay device 20-2 corrects the above-mentioned "predetermined base time" managed by itself by the difference specified by the correction request. As a result, the relay device 20-3 and the relay device 20-2 are synchronized.

<Modification>

In the example described above, each of the information processing devices 10 and each of the relay devices 20 are connected via the in-vehicle Ethernet network. The disclosed technique can be applied also to a system in which a plurality of different network systems, such as an in-vehicle Ethernet and a Controller Area Network (CAN), are connected by a gateway. In this case, as in the first embodiment, one of the relay devices 20 may correct the sending time of each ECU connected to the CAN via the gateway. It is also possible for the gateway to have the function of the correction unit 24 of the relay device 20 described above. It is also possible for the gateway to have the function of the correction unit 24 of the relay device 20 according to the second embodiment.

<Effect of the Embodiments>

For example, when periodic communication is carried out between a plurality of ECUs via a network, such as an in-vehicle Ethernet network, without synchronizing between the ECUs and, in this environment, when an error occurs, there is a problem that, when an attempt is made to make a reproducibility test, it is sometimes difficult to reproduce the communication environment at the time of the error. In addition, when a best-effort type in-vehicle Ethernet network is used, there is a problem in that, when congestion occurs, the receiving-side ECU cannot receive a packet within the expected time due to a packet loss.

On the other hand, the use of a product conforming to a standard, such as FlexRay, TTEhernet, or Time-Sensitive Networking (TSN), requires that the ECUs be relatively strictly synchronized with each other, meaning that the cost of hardware becomes relatively high.

According to the embodiments described above, when the sending period and the data size of data to be sent from each the information processing devices 10 are known in advance, it is possible to design a schedule, designed in such a way that a packet loss does not occur in the relay device 20, and to set the designed schedule in the relay device 20. Then, the relay device 20 corrects the sending time of each the information processing device 10 according to the schedule. This makes it possible to implement a communication system in which a packet loss does not occur in the relay device 20.

<Summary>

According to the embodiment described above, the relay device 20 corrects the time at which the information processing device 10 sends data, based on the difference between the time at which the data was received and the reception time defined for the data. This correction method makes it possible to relatively easily correct the time at which data is sent.

The relay device 20 in the above embodiment may be implemented, in part or in whole, by an integrated circuit such as a Large Scale Integration (LSI), Application Specific Integrated Circuit (ASIC), or Field-Programmable Gate Array (FPGA). Each functional block of the relay device 20 may be individually implemented as a processor or may be integrated, in part or in whole, into a processor.

While the embodiments of the present disclosure have been described above in detail, it is to be understood that the present disclosure is not limited to the specific embodiments and that various modifications and changes may be made within the scope of the present disclosure.

What is claimed is:

1. An in-vehicle relay device, the in-vehicle relay device being used in an in-vehicle network to which a first in-vehicle device and a second in-vehicle device are connected in a communicable way, the in-vehicle relay device comprising:

a receiving unit configured to receive first data from the first in-vehicle device;

a forwarding unit configured to forward the first data to the second in-vehicle device; and a correction unit configured to correct a sending time of the first in-vehicle device at which the first in-vehicle device is to send data, wherein the in-vehicle relay device includes scheduling data including a first defined receiving time, wherein the first defined receiving time is preset according to a data size of data including the first data such that a packet loss does not occur in the in-vehicle relay device, wherein the first in-vehicle device is at least one of an electronic control unit or sensor, and wherein the in-vehicle relay device is at least one of a layer 2 switch, a layer 3 switch, or a router, wherein the correction unit is configured to acquire the sending time of the first in-vehicle device when a priority of the first data is equal to or higher than a predetermined priority, wherein the correction unit is further configured to send a sending time correction request including information on a difference between the sending time of the first in-vehicle device and a time at which a packet of data is received from the first in-vehicle device when the difference is equal to or greater than a predetermined threshold, wherein the priority of the first data is determined by using an Ethernet header including a 3-bit Class of Service (CoS) field or a predetermined field of an IP header according to a Type of Service (ToS) or a Differentiated Services (DiffServ), and wherein the first in-vehicle device comprises a control unit, the control unit is configured to correct subsequent sending times based on the received sending time correction request when the priority of the first data is equal to or higher than the predetermined priority, and not to correct the subsequent sending times when the priority of the first data is lower than the predetermined priority.

2. The in-vehicle relay device according to claim 1 wherein the correction unit is further configured to return a data-sending pause request to the first in-vehicle device when the priority of the first data is lower than the predetermined priority and when a free space of a buffer in the in-vehicle relay device is equal to or less than a predetermined threshold value, the data-sending pause request including a specification of a predetermined pause time.

3. The in-vehicle relay device according to claim 1, wherein the correction unit is further configured to determine the priority of the first data based on at least one of a communication protocol of the first data, a communication address of a sending source of the first data, and a communication address of a destination of the first data.

4. The in-vehicle relay device according to claim 1, wherein the receiving unit is configured to receive second data from another in-vehicle relay device, the second data indicating a synchronization time between the in-vehicle relay device and the another in-vehicle relay device, and the correction unit is further configured to cause the another in-vehicle relay device to synchronize with the in-vehicle relay device based on a difference between a second receiving time and a second defined receiving time, the second receiving time being a time at which the second data indicating the synchronization time is received by the receiving unit, the second defined receiving time being a time defined for the second data to be received by the receiving unit.

5. An information processing system, comprising:
a first information processing device; and
a relay device used in a network to which the first information processing device and a second information processing device are connected in a communicable way, wherein
the relay device includes
a first receiving unit configured to receive first data from the first information processing device,
a forwarding unit configured to forward the first data to the second information processing device, and
a correction unit configured to send a correction request including a request for correcting a sending time of the first information processing device at which the first information processing device is to send data,
wherein the relay device includes scheduling data including a first defined receiving time,
wherein the first defined receiving time is preset according to a data size of data including the first data such that a packet loss does not occur in the relay device,
wherein the first information processing device is at least one of an electronic control unit or sensor,
wherein the relay device is at least one of a layer 2 switch, a layer 3 switch, or a router, and wherein the first information processing device includes
a sending unit configured to send data,
a second receiving unit configured to receive the correction request, and
a control unit configured to correct the sending time according to the correction request,
wherein the correction unit is configured to acquire the sending time of the first information processing device when a priority of the first data is equal to or higher than a predetermined priority, and
wherein the correction unit is further configured to send a sending time correction request including information on a difference between the sending time of the first information processing device and a time at which a packet of data is received from the first information processing device when the difference is equal to or greater than a predetermined threshold,
wherein the priority of the first data is determined by using an Ethernet header including a 3-bit Class of Service (CoS) field or a predetermined field of an IP header according to a Type of Service (ToS) or a Differentiated Services (DiffServ), and
wherein the control unit is configured to correct subsequent sending times based on the received sending time correction request when the priority of the first data is equal to or higher than the predetermined priority, and not to correct the subsequent sending times when the priority of the first data is lower than the predetermined priority.

6. A relay device comprising:
a receiving unit configured to receive first data from a first information processing device;
a forwarding unit configured to forward the first data to a second information processing device; and
a correction unit configured to correct a sending time of the first information processing device at which the first information processing device is to send data,
wherein the relay device includes scheduling data including a first defined receiving time,
wherein the first defined receiving time is preset according to a data size of data including the first data such that a packet loss does not occur in the relay device,
wherein the first information processing device is at least one of an electronic control unit or sensor, and
wherein the relay device is at least one of a layer 2 switch, a layer 3 switch, or a router,
wherein the correction unit is configured to acquire the sending time of the first information processing device when a priority of the first data is equal to or higher than a predetermined priority,
wherein the correction unit is further configured to send a sending time correction request including information on a difference between the sending time of the first information processing device and a time at which a packet of data is received from the first information processing device when the difference is equal to or greater than a predetermined threshold,
wherein the priority of the first data is determined by using an Ethernet header including a 3-bit Class of Service (CoS) field or a predetermined field of an IP header according to a Type of Service (ToS) or a Differentiated Services (DiffServ), and
wherein the first information processing device comprises a control unit, the control unit is configured to correct subsequent sending times based on the received sending time correction request when the priority of the first data is equal to or higher than the predetermined priority, and not to correct the subsequent sending times when the priority of the first data is lower than the predetermined priority.

7. An information processing device, comprising:
a sending unit configured to send data at a predetermined time;
a receiving unit configured to receive a request for correcting a time at which the data is to be sent; and
a control unit configured to correct the time at which the data is to be sent according to the request received by the receiving unit,
wherein an in-vehicle relay device includes scheduling data including a first defined receiving time,
wherein the first defined receiving time is preset according to a data size of data including first data such that a packet loss does not occur in the in-vehicle relay device, and
wherein the information processing device is at least one of an electronic control unit or sensor,
wherein the in-vehicle relay device comprises a correction unit, the correction unit is configured to acquire a sending time of the information processing device when a priority of the first data is equal to or higher than a predetermined priority,
send a sending time correction request including information on a difference between the sending time of the information processing device and a time at which a packet of data is received from the information processing device when the difference is equal to or greater than a predetermined threshold,
wherein the priority of the first data is determined by using an Ethernet header including a 3-bit Class of Service (CoS) field or a predetermined field of an IP header according to a Type of Service (ToS) or a Differentiated Services (DiffServ), and wherein the control unit is configured to correct subsequent sending times based on the received sending time correction request when the priority of the first data is equal to or higher than the predetermined priority, and not to correct the subsequent sending times when the priority of the first data is lower than the predetermined priority.

8. An information processing method comprising:
(a) receiving, by a relay device, first data from a first information processing device, the relay device being used in a network to which the first information processing device and a second information processing device are connected in a communicable way;
(b) forwarding, by the relay device, the first data to the second information processing device; and
(c) correcting a time at which the first information processing device is to send data,
wherein the relay device includes scheduling data including a first defined receiving time,
wherein a first defined receiving time is preset according to a data size of data including the first data such that a packet loss does not occur in the relay device,
wherein the first information processing device is at least one of an electronic control unit or sensor, and
wherein the relay device is at least one of a layer 2 switch, a layer 3 switch, or a router, the method further comprising:
acquiring sending time of the first information processing device when a priority of the first data is equal to or higher than a predetermined priority,
sending a sending time correction request including information on a difference between the sending time of the first information processing device and a time at which a packet of data is received from the first information processing device when the difference is equal to or greater than a predetermined threshold,
wherein the priority of the first data is determined by using an Ethernet header including a 3-bit Class of Service (CoS) field or a predetermined field of an IP header according to a Type of Service (ToS) or a Differentiated Services (DiffServ), and
wherein the first information processing device comprises a control unit, the control unit is configured to correct subsequent sending times based on the received sending time correction request when the priority of the first data is equal to or higher than the predetermined priority, and not to correct the subsequent sending times when the priority of the first data is lower than the predetermined priority.

9. A non-transitory recording medium storing a program, the program being executable by a relay device, the relay device being used in a network to which a first information processing device and a second information processing device are connected in a communicable way, the relay device having at least one processor, wherein the program, when executed by the at least one processor, causes the relay device to execute a method, the method comprising:
(a) receiving first data from the first information processing device;
(b) forwarding the first data to the second information processing device; and
(c) correcting a sending time at which the first information processing device is to send data,
wherein the relay device includes scheduling data including a first defined receiving time,
wherein the first defined receiving time is preset according to a data size of data including the first data such that a packet loss does not occur in the relay device,
wherein the first information processing device is at least one of an electronic control unit or sensor, and
wherein the relay device is at least one of a layer 2 switch, a layer 3 switch, or a router,
the method further comprising:
acquiring sending time of the first information processing device when a priority of the first data is equal to or higher than a predetermined priority,
sending a sending time correction request including information on a difference between the sending time of the first information processing device and a time at which a packet of data is received from the first information processing device when the difference is equal to or greater than a predetermined threshold,
wherein the priority of the first data is determined by using an Ethernet header including a 3-bit Class of Service (CoS) field or a predetermined field of an IP header according to a Type of Service (ToS) or a Differentiated Services (DiffServ), and
wherein the first information processing device comprises a control unit, the control unit is configured to correct subsequent sending times based on the received sending time correction request when the priority of the first data is equal to or higher than the predetermined priority, and not to correct the subsequent sending times when the priority of the first data is lower than the predetermined priority.

* * * * *